Patented Jan. 2, 1945

2,366,260

UNITED STATES PATENT OFFICE 2,366,260

DRYING COMPOSITION FOR NAIL POLISH

Rowena Curry Hickey, Omaha, Nebr., assignor of one-half to Lorenzo Donarico, Omaha, Nebr.

No Drawing. Application July 1, 1942,
Serial No. 449,347

1 Claim. (Cl. 167—85)

This invention relates to improvements in compositions useful to promote accelerated drying of coating compositions, such as nail polishes and lacquers.

The slow drying of such nail polishes or lacquers is a source of considerable inconvenience. Moreover, and not infrequently, due to the retarded drying rate and the character of the volatile materials usually present in such polishes or lacquers, the final coating lacks the desired lustre and smoothness because the volatiles liberated from the film produce an irregular surface.

It is the primary object of this invention to provide a composition which may be applied over the "wet" nail polish or lacquer and substantially increase the drying rate thereof while at the same time eliminating the possibility of a roughened film. By "wet" nail polish is meant the condition of the polish immediately after one or two coats have been applied to the eight fingers and two thumbs, at which time the usual polish has its surface stratum or skin semi-dry or fixed to an extent that the drying composition may be applied as by a brush without marking and the under strata vary downwardly progressively in fluidity and plasticity because of the presence of substantial amounts of volatile solvent.

Another object of the invention is to provide a composition which is applied over the "wet" polish and which possesses two important characteristics, namely, (1) strong affinity or absorption power for the volatile ingredient or ingredients of the polish accompanied by inertness to the lacquer constituents which form the final film; and (2) mobility so as to flow toward the cuticle and simultaneously remove the volatile constituents from the coating and carry the same toward the tissue surrounding the nail where the composition may be absorbed, allowed to dry or be wiped off if desired. Of particular significance, the removal of the volatile constituent into the drying composition while the polish is still "wet" assures that volatilization into the air takes place from the drying composition and not from the lacquer surface. The drying composition acts as a flow agent and allows the lacquer to flow during drying to the extent that passage therethrough of the volatiles is afforded whereupon the passages close up or are covered over, so that a smooth continuous dry surface is produced rapidly, and this is also true in the area of the cuticle since here both volatilization and absorption simultaneously occur.

Another object of the invention is to employ in the drying composition an ingredient which is in the nature of an emollient so that the tissue at the cuticle is soothed. In this connection, also, a suitable bactericide and antiseptic may be incorporated in the composition which will have the additional function of preventing infection as where the skin or tissue at the cuticle is cut or bruised.

The drying composition, while not primarily a protective for the nail polish, may, in some instances, have this effect, thereby insuring that the coating will be long-lasting and not readily chipped or cracked by abrasion or changes in temperature.

The use of flow agents in varnishes or lacquers to maintain the coating flowable during elimination of solvent is well known, but such an expedient is not practical in the case of nail polishes which usually comprise a cellulose derivative, a plasticizer and a solvent. That is, the tendency would be to unduly thin or thicken the polish and retard its drying while the problem of precluding a roughened surface due to volatilization would remain. So-called protective coatings are now available for application over the nail polish, but these are not of a drying type and, in fact, possess principally an astringent characteristic.

The following representative composition is applied over the wet nail polish or lacquer, and, in addition to assuring rapid drying, accomplishes the function of a flow agent to form a smooth continuous coating. In this connection, as pointed out above, the drying composition exhibits a strong affinity or absorption power for the volatile constituent or constituents of the "wet" nail polish without affecting the ability of the plasticizer and lacquer ingredients to produce the desired surface film. In fact, the drying composition is present in amount to be in equilibrium with any ingredient of the lacquer which should remain in the final film notably the plasticizer while acting as a solvent or removal agent for those constituents usually volatile which are desirably rapidly withdrawn to accelerate drying.

|  | Parts |
|---|---|
| Sweet oil | 24 |
| Castor oil | 1 |
| Denatured alcohol—70% | 2 |
| Coloring to suit. | |

The alcohol is a very strong drying agent. If the alcohol were used by itself, it would cause the polish to dry at such a rapid rate as to cause a great excess of bubbling. By combining the rapid drying agent, viz., the alcohol, with the sweet oil and castor oil combination, it acts not only as a drying agent but as a fluid wash. The alcohol causes the bubbling at such a rate that upon reaching the surface of the polish, the gases expel themselves into the oil, are absorbed and washed to the sides of the nail, leaving the surface clear, dry and smooth.

I have found drying, semi-drying and non-drying vegetable oils and animal oils to be useful such as fatty oils and their mixtures of which the following are illustrative: Olive oil, arachis oil, sesame oil, almond oil, raw linseed oil, boiled linseed oil, poppyseed oil, corn oil, cottonseed oil, neat's-foot oil, castor oil and fish-liver oil. Castor oil is sometimes used as a plasticizer in the nail lacquer so that the use of pure castor oil or mixtures containing a larger amount of castor oil dries the film, but leaves it quite soft. The castor oil is only used in the drying composition in such amount as keeps it in equilibrium with the plasticizer in the lacquer. Instead of castor oil, camphor, dialkyl-phthalates (dimethyl-phthalate, diethyl-phthalate, dibutyl-phthalate, diamyl-phthalate), synthetic resins and other plasticizers may be used. The castor oil undiluted is not completely satisfactory, because of its viscosity.

In some cases, an antioxidant also may be added to the oils in order to prohibit rancidity through oxidation. The antioxidants may be di- or tri-oxyphenylene compounds, lecithin, tocopherols, etc. Liquid fatty acids, like oleic acid have good drying effects.

Alcohols of the monovalent-aliphatic type such as isopropyl and butyl-alcohol and bi- or polyvalent aliphatic alcohols such as ethylene-glycol and propylene glycol may be used. Glycerol, preferably in mixtures, is satisfactory as is also cyclohexanol.

Of the etheric oils and synthetic aromatics, which are good drying agents alone or in mixtures, eucalyptus oils available on the market, citronella oil and lemon oil (California) are satisfactory.

Bactericidal and antiseptic compounds as well as detergents and penetrants may be included in the composition.

The drying action of the composition referred to herein appears to be purely a physical one and the absorptive power or affinity of the composition for the volatile ingredients of the nail polish is a measure of the rapidity with which drying takes place. As explained, the composition is prepared so that in any particular case those ingredients of the polish which are to remain in the film will not be absorbed, i. e., diffusion of the plasticizer in the lacquer to the drying agent is reduced as far as possible. Various drying agents may be used dependent particularly upon the solvents employed in the nail polish.

Only a very small amount of the drying agent or composition is necessary to dry the polish in a few minutes so that its use is inexpensive and the inconvenience of retarded drying now experienced and often fifteen to twenty minutes is overcome.

I claim:

A liquid drying composition for finger nail polish comprising as its essential ingredients olive oil 24 parts, castor oil 1 part and denatured alcohol 2 parts.

ROWENA CURRY HICKEY.